6532

358-69. OR 3,688,024 SR

United States Patent [15] 3,688,024

Van Den Avoort et al. [45] Aug. 29, 1972

[54] COLOR TELEVISION DISPLAY DEVICE WITH INDEX TYPE CATHODE RAY TUBE

[72] Inventors: Pieter Marinus Van Den Avoort; Lieuwe Terpstra, both of Emmasingel, Eindhoven, Netherlands

[73] Assignee: U.S. Philips Corporation, New York, N.Y.

[22] Filed: May 1, 1970

[21] Appl. No.: 33,744

[30] Foreign Application Priority Data

May 9, 1969 Netherlands..............6907098

[52] U.S. Cl...............................................178/5.4 F
[51] Int. Cl...............................................H04n 9/24
[58] Field of Search....................................178/5.4 F

[56] References Cited

UNITED STATES PATENTS

| | | | |
|---|---|---|---|
| 3,109,886 | 11/1963 | Boothroyd | 178/5.4 F |
| 3,193,618 | 7/1965 | Cornelissen et al. | 178/5.4 F |
| 3,234,324 | 2/1966 | Mutschler | 178/5.4 F |
| 3,249,688 | 5/1966 | Davidse et al. | 178/5.4 F |
| 3,283,064 | 11/1966 | Cornelissen et al. | 178/5.4 F |
| 3,301,944 | 1/1967 | Cornelissen et al. | 178/5.4 F |

*Primary Examiner*—Robert L. Griffin
*Assistant Examiner*—John C. Martin
*Attorney*—Frank R. Trifari

[57] ABSTRACT

A color television picture display device including an indexing tube and a frequency divider circuit for related indexing wherein a run-in circuit of this frequency divider circuit includes a trigger circuit so as to avoid phase uncertainty which trigger circuit establishes the end of the run-in signal applied to the frequency divider circuit always after one full period thereof and wherein consequently a digital frequency divider circuit may be used fruitfully.

5 Claims, 5 Drawing Figures

Figure 1:
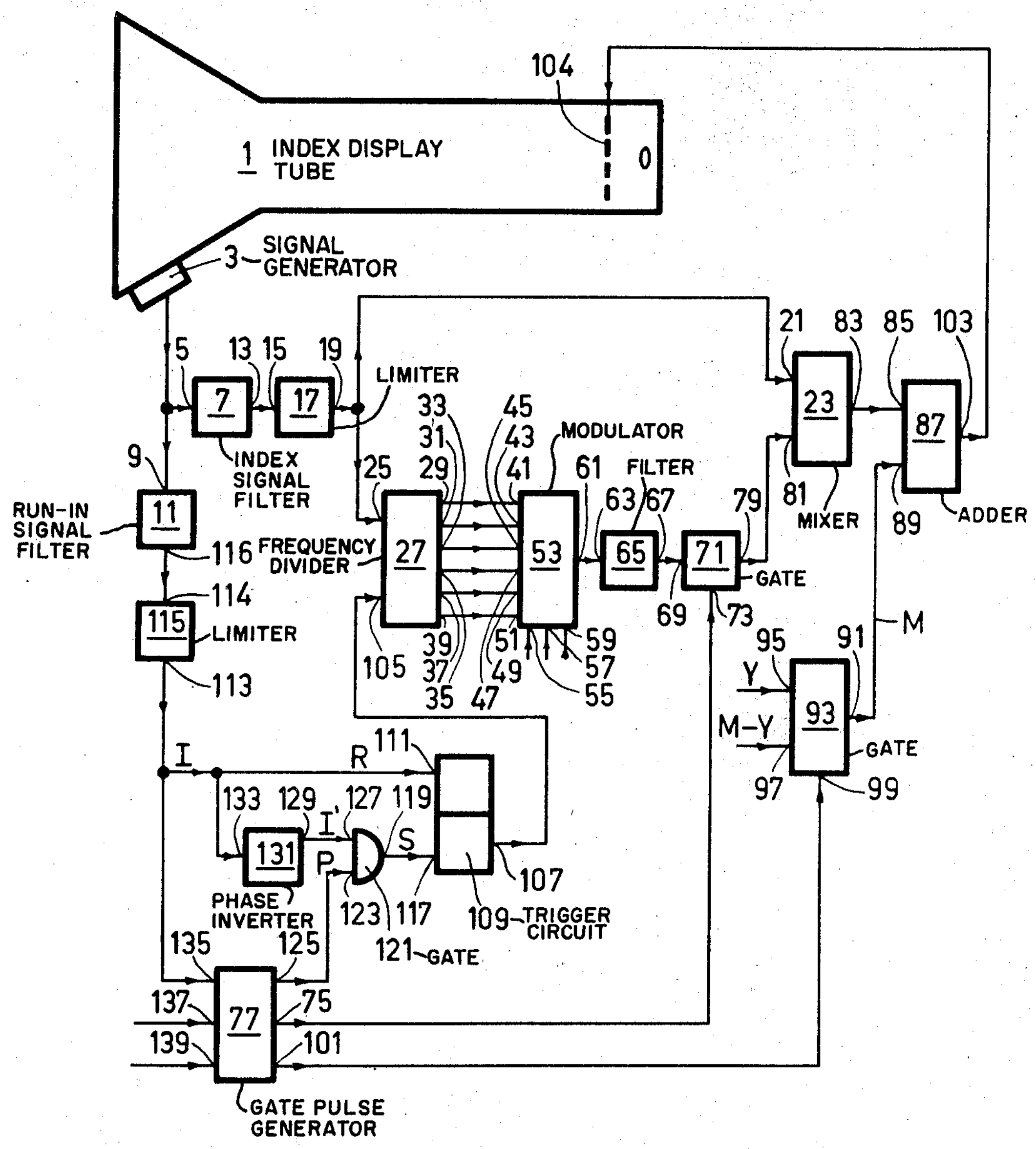

INVENTORS.
PIETER M VAN DEN AVOORT
LIEUWE TERPSTRA
BY

AGENT

INVENTORS.
PIETER M. VAN DEN AVOORT
LIEUWE TERPSTRA
BY
AGENT

INVENTORS.
PIETER M. VAN DEN AVOORT
LIEUWE TERPSTRA
BY
AGENT

INVENTORS.
PIETER M. VAN DEN AVOORT
LIEUWE TERPSTRA
BY
AGENT

COLOR TELEVISION DISPLAY DEVICE WITH INDEX TYPE CATHODE RAY TUBE

The invention relates to a color television picture display device for the display of a television signal on a color display tube of the indexing type, which picture display device comprises a frequency conversion circuit for converting an indexing signal having an indexing frequency obtained from a signal generator of the display tube into a writing signal to be applied to a control electrode of the display tube and having a writing frequency in a fractional ratio to the indexing frequency, said conversion circuit including a frequency divider circuit having a run-in signal input which is connected to an output of a combination circuit a first input of which is connected to an output of the signal generator and a second input of which is connected to an output of a gating pulse generator so that a run-in signal can be applied to the run-in signal input of a frequency divider during the commencement of a line scanning by means of the combination circuit.

A color television picture display device of the kind described above is known from U.S. Pat. No. 3,234,324. In this device a run-in signal is admitted to the frequency divider circuit with the aid of a gating signal originating from the gating pulse generator and applied to the combination circuit for so long a period that the control of the frequency divider circuit is taken over by an indexing signal received at an indexing signal input thereof. A phase uncertainty in a frequency-divided indexing signal must not occur at the output of the frequency divider circuit because otherwise the colors would be incorrectly displayed on the picture display tube. The run-in signal applied to the frequency divider circuit serves to prevent this phase uncertainty by previously bringing the frequency divider circuit to a given phase.

An object of the present invention is to reduce the risk of a possible phase uncertainty to a considerable extent.

To this end a picture display device of the kind described in the preamble according to the invention is characterized in that the connection from the output of the combination circuit to the run-in signal input of the frequency divider circuit includes a trigger circuit a set input of which is connected to an output of the combination circuit, a reset input of which is connected to the first input of the combination circuit and an output of which is connected to the run-in signal input of the frequency divider circuit.

It is achieved with the aid of the trigger circuit and the mentioned operation of the reset input thereof that the end of the run-in signal passed on by the combination circuit always coincides with the end of an entire period of the run-in signal provided by the signal generator and that the end of the run-in signal passed on to the run-in signal input of the frequency divider circuit thus always has substantially the same waveform. The control of the frequency divider circuit by means of the indexing signal thus commences always under the same circumstances after the end of the run-in signal..

The applicant has found that in the combination circuits used until now a phase uncertainty might occur at the commencement of an indexing period which was due to the comparatively arbitrary instant when the operation of the frequency divider by means of the run-in signal was discontinued and was succeeded by the indexing signal control.

Due to the step according to the invention this uncertainty is eliminated because the end of the run-in signal is no longer only determined by the end of the gating signal which is applied to the combination circuit, but is also determined by the run-in signal itself so that, as already described above, always the same transition from the operation of the frequency divider circuit by means of the run-in signal to the indexing signal control is obtained.

Due to this transition which remains equal it becomes possible to use a digital frequency divider circuit to advantage in accordance with a further embodiment of the present invention. Unlike the common regenerative divider circuits this circuit has not one or more resonant circuits which may have an integrating action on a phase uncertainty. Due to the absence of the resonant circuits and the integrating action thereof, a digital frequency divider circuit has the advantage that it can quickly react to phase variations and does not cause phase uncertainty when such phase variations occur. In addition the absence of filters shortens the transit time of the signals in the divider circuit. The uniform transition from the operation by means of the run-in signal to the indexing signal control, which transition is required for a digital frequency divider circuit, can easily be obtained with the aid of the trigger circuit in the run-in circuit.

In order that the invention may be readily carried into effect a few embodiments thereof will now be described in detail by way of example with reference to the accompanying diagrammatic drawing in which for the sake of clarity the details which are not important for the understanding of the invention have been omitted as much as possible.

Figure 2:
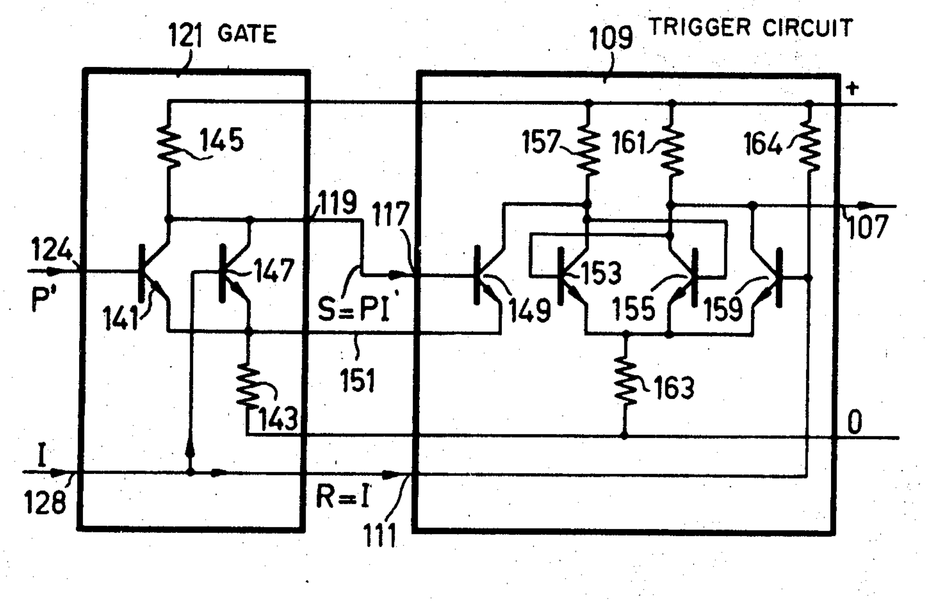
Figure 3:
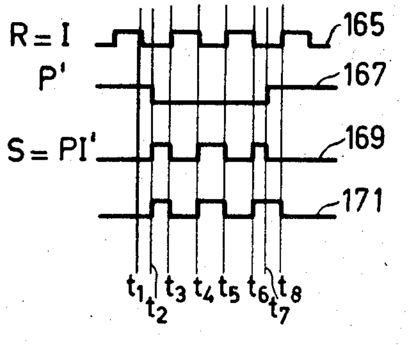
Figure 4:
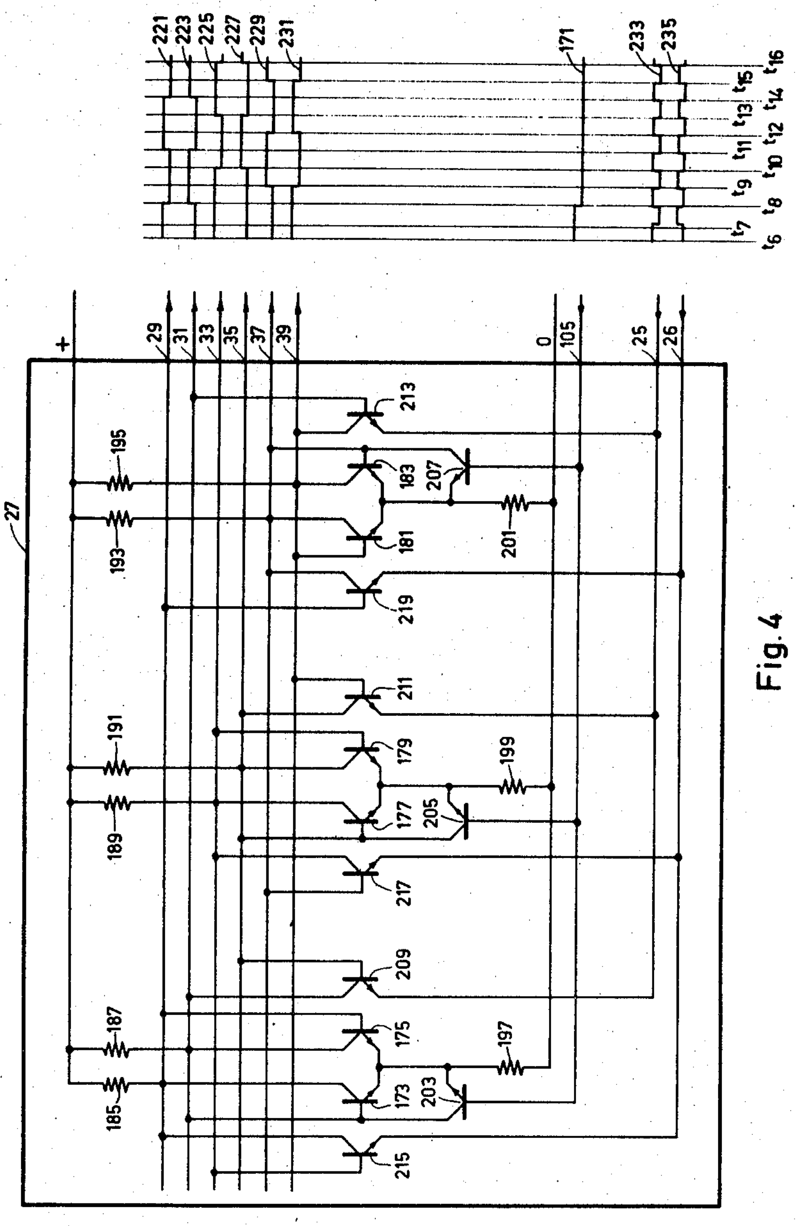
Figure 5:
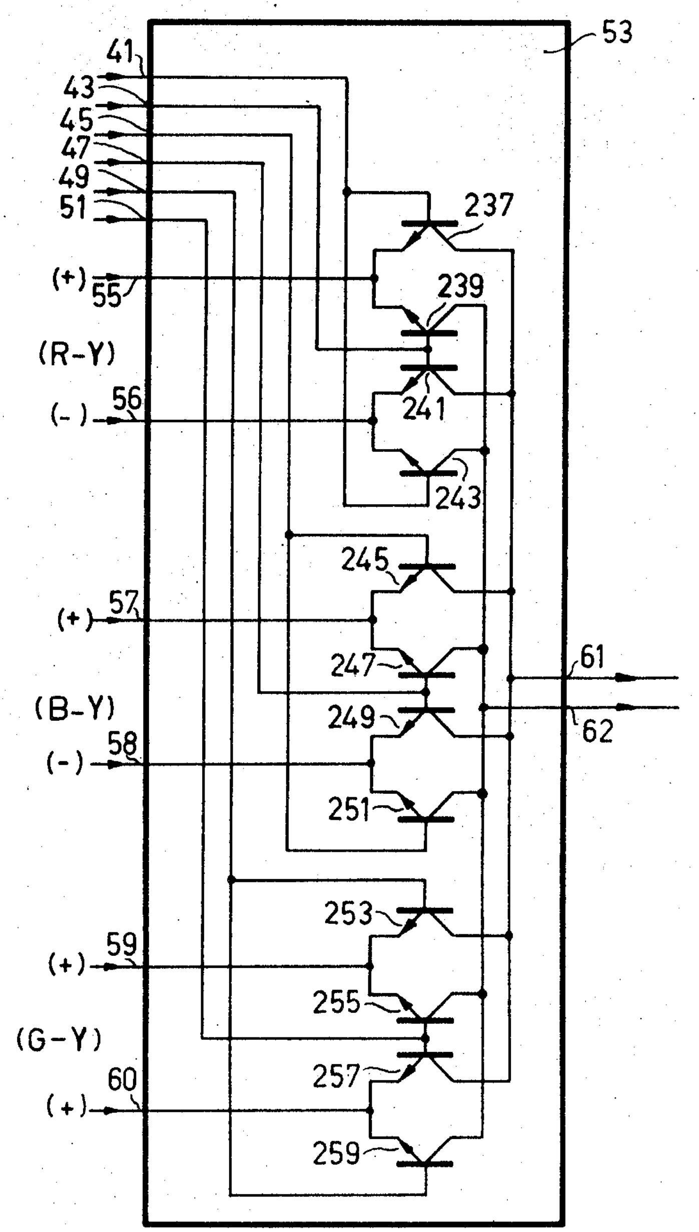

FIG. 1 shows by way of a non-detailed circuit diagram an embodiment of a color television picture display device according to the invention, FIG. 2 shows by way of a non-detailed principle circuit diagram a combination and a trigger circuit for a color television picture display device according to the invention, FIG. 3 shows a plurality of waveforms of signals associated with a combination and trigger circuit according to FIG. 2, FIG. 4 shows a non-detailed principle circuit diagram of a digital frequency divider circuit formed as a symmetric ring counter (providing voltages having a square waveform) for a picture display device according to the invention, and a few waveforms of voltages at the outputs and inputs of the divider circuit, FIG. 5 shows a non-detailed principle circuit diagram of a modulation circuit which can be controlled by a digital frequency divider circuit according to FIG. 4 for introducing color information into the signal originating from the frequency divider circuit.

In FIG. 1 a picture display tube 1 has a signal generator 3. The picture display tube 1 is of the indexing type and the signal generator 3 is generally a photomultiplier which is sensitive to ultraviolet light periodically emitted on the screen of the picture display tube during scanning of indexing strips by means of an electron beam at a frequency which is dependent on the scanning rate a and the density of the strips. The edge of the screen of the picture display tube 1 has so-called run-in strips which produce inter-alia a run-in signal in the signal generator 3 during scanning by means of an electron beam, and the actual indexing strips on the rest of the picture screen which strips produce an indexing signal in the signal generator 3 during scanning. The frequency fundamental of this indexing signal is in a fractional ratio to the frequency of the fundamental of the writing signal which is the signal to be displayed (related indexing). This ratio is determined by the ratio between the number of indexing strips and the number of groups of color strips. The run-in signal has a component the phase of which is uniformly coupled to the phase of the fundamental of the writing signal.

The signal generator 3 is connected to an input 5 of an indexing signal filter 7 and to an input 9 of a run-in signal filter 11. The indexing signal filter 7 mainly passes signal components of the indexing signal frequency and the run-in signal filter 11 mainly passes signal components of the run-in signal frequency. The run-in signal passed by filter 11 will hereinafter be considered the run-in signal.

An output 13 of the indexing signal filter 7 is connected to an output 15 of an indexing signal limiter circuit 17. An output 19 of the indexing signal limiter circuit 17 is connected at one end to a first input 21 of a mixer circuit 23 and at the other end to an indexing signal input 25 of a frequency divider circuit 27 which according to the invention is preferably formed as a digital divider circuit. The frequency divider circuit 27 has six outputs 29, 31, 33, 35, 37 and 39 which are connected to inputs 41, 43, 45, 47, 49 and 51, respectively, of a modulator circuit 53. The frequency divider circuit 27, a more detailed circuit diagram of an embodiment of which is shown in FIG. 4, divides the frequency of the indexing signal applied to the input 25 by a factor of 3 and applies balanced voltages to the output pairs 29, 31; 33, 35 and 37, 39 and the corresponding input pairs 41, 43; 45, 47 and 49, 51 of the modulator circuit which voltages are shifted in phase from pair to pair over a third period (120°).

Furthermore, the modulator circuit 53 has three inputs 55, 57 and 59 to which color difference signals are applied. FIG. 5 shows a favorable embodiment according to the invention of a modulator circuit 53 in a more detailed form. An output 61 of the modulator circuit 53 is connected to an input 63 of a filter 65. Unwanted signal components are removed by the filter 65 which components have been produced in the modulator circuit 53 during modulation of the signal applied to the input thereof.

An output 67 of the filter 65 is connected to an input 69 of a gating circuit 71. The gating circuit 71 has an operation signal input 73 which is connected to an output 75 of a gating pulse generator 77. The gating circuit 71 receives an operation signal from this output 75 of the gating pulse generator 77 which signal cuts off the gating circuit 71 during the occurrence of the run-in signal and renders the gating circuit 71 conducting during the occurrence of the indexing signal. Such a circuit 77 is described in FIG. 3 of said prior mentioned patent.

An output 79 of the gating circuit 71 is connected to an input 81 of the mixer circuit 23. The signal path from the output 19 of the limiter circuit 17 to the second input 21 is generally referred to as the phase compensation branch. A signal is obtained by mixing in the mixer circuit 23 which signal has a frequency which is equal to the difference of the frequencies of the signals applied to the inputs 21 and 81, hence two-thirds of the indexing frequency. This signal appears at an output 83 of the mixer circuit 23 and contains the color information in a dot-sequential form suitable for a display on the picture display tube, while the phase of this signal is substantially independent of frequency-dependent transit times in the circuit as a result of the choice of the transit times of the filters in the phase compensation branch.

The output 83 of the mixer circuit 23 is connected to a first input 85 of an adder circuit 87. A second input 89 of the adder circuit 87 is connected to an output 91 of a second gating circuit 93. The second gating circuit 93 has a first input 95 to which a luminance signal Y is applied, a second input 94 to which a luminance correction signal (M-Y) is applied and a third input 99 to which an operation signal is applied. To this end the third input 99 of the gating circuit 93 is connected to an output 101 of the gating pulse generator 77. The second gating circuit 93 is rendered conducting during the occurrence of both the run-in signal and the indexing signal by means of the operation signal applied to the input 99 of the second gating circuit and furthermore a constant level is introduced during the occurrence of the run-in signal into a combination signal M of the luminance signal Y and the luminance correction signal (N-Y) which becomes available at the output 91 of the second gating circuit 93. As a result of this constant level the beam current of the picture display tube 1 is brought to a value during the run-in period such that a favorable run-in signal-to-noise ratio is obtained.

The dot-sequential color information signal applied to the first input 85 and having a writing frequency which is equal to two-thirds of the indexing frequency is combined in the adder circuit 87 with the corrected luminance signal applied to the second input 89. An output 103 of the adder circuit 87 is connected to a control electrode 104 of the picture display tube 1. A sum signal of the color information signal and the corrected luminance signal is applied for display through this connection to the picture display tube 1.

Furthermore, the frequency divider circuit 27 has a run-in signal input 105 which according to the invention is connected to an output 107 of a trigger circuit 109. A reset input 111 of the trigger circuit 109 is connected to an output 113 of a run-in signal limiter circuit 115 an input 114 of which is connected to an output 116 of the run-in signal filter 11. A set input 117 of the trigger circuit 109 is connected to an output 119 of a combination circuit 121 formed as an AND-gate circuit. A first input 123 of the AND-gate circuit 121 is connected to an output 125 of the gating pulse generator 77 and a second input 127 is connected to an output 129 of a phase inverter circuit 131 an input 133 of which is connected to the output 113 of the run-in signal limiter circuit 115.

Furthermore, the output 113 of the run-in signal limiter circuit 115 is connected to a first input 135 of the gating impulse generator 77. A second input 137 of this gating pulse generator 77 receives a field flyback pulse and a third input 139 receives a line flyback pulse.

The operation of the trigger circuit 109 is as follows: due to the action of the AND-gate circuit 121 a limited run-in signal I' inverted by the phase inverter circuit 131 appears at the set input 117 of the trigger circuit 109 only during the occurrence of a gating pulse P originating from the third output 125 of the gating pulse generator 77. This signal S is indicated Boolean algebraically by PI'. The trigger circuit 109 assumes what will be called a set condition on the positive going edges of this signal S. A limited run-in signal I the positive going edges of which brings the trigger circuit in a different condition, called reset condition, appears continuously at the reset input 111. In the absence of the gating pulse P (P=0) the trigger circuit 109 thus remains continuously in its reset condition. Only in the presence of the gating pulse P (P= 1) the positive going edges of the inverted run-in signal I' can bring the trigger circuit 109 in its set condition. The reset condition is then resumed with the aid of the positive going edges of the run-in signal I applied to the reset input 111. These positive going edges coincide with the negative going edges of the inverted run-in signal S applied to the set input 117 and appearing at 119 during the occurrence of the gating pulse P. As a result a square-wave voltage is obtained at the output 107 of the trigger circuit 109 the end of which voltage is always determined by an edge of the run-in signal itself occurring in the vicinity of the gating pulse edge, which edge thus always coincides with the end of an entire period of the run-in signal. Thus a run-in signal which always ends at an entire period independently of the end of the gating pulse P is applied to the input 105 of the frequency divider circuit 27 with the aid of this circuit according to the invention so that the transition from the operation of the frequency divider circuit 27 by means of the run-in signal to the indexing signal control is always equal with the result that a phase uncertainty in the frequency divider circuit 27 cannot occur.

It will be evident that the limitation of the run-in signal is in principle not necessary for using the step according to the invention. However, when using the run-in signal limiter circuit 115 an additional accurate transition from the run-in condition to the indexing condition of the frequency divider circuit 27 is obtained which in addition to being independent of the end of the gating pulse is also independent of the amplitude of the run-in signal so that the phase uncertainty of the frequency divider circuit 27 is still further reduced.

As stated above the control of the reset and set inputs of the trigger circuit 109 is ensured in a direct manner and through a phase inverter stage 131 and an AND-gate circuit 121. Thus a signal S is applied to the set input 117 of the trigger circuit 109 and a signal R is applied to the reset input. It will be evident that instead of an AND-gate circuit it is alternatively possible to use an OR-gate circuit from which, for example, a signal (P' + I) can be derived which can subsequently be inverted in phase and in turn produces a signal S. The control of such an OR-gate must then be adapted. A gating pulse P' having a polarity which is opposite to that of the given embodiment must be applied to one input and a non-inverted run-in signal I must be applied to the other input.

Furthermore, it is, for example, possible to use a trigger circuit which reacts to negative going edges of the set and reset signals. The set and reset signals then must have a polarity which is opposite to that required for the given embodiment. For trigger circuits having set and reset inputs which react to the edges of opposite polarity it will be possible to easily find out the polarity of the set and reset signals with the aid of the above and the embodiment to be referred to with reference to FIG. 2.

The gating pulse generator 77 applies to its output 125 the gating signals P used for the operation of the AND-gate circuit 127. These gating signals P can be obtained in, for example, conventional manner with the aid of the run-in signal applied to the first input 135 of the gating circuit 177 and line and field flyback pulses applied to the inputs 137 and 139.

FIG. 2 shows a combination of a trigger circuit 109 and a gating circuit 121 wherein the trigger circuit 109 reacts to positive going edges of set and reset signals and the gating circuit 121 is a so-called NOR-gate circuit. The same reference numerals have been used in so far as they correspond with the circuit arrangement of FIG. 1.

The gating circuit 121 has a gating pulse input 124 to which a gating pulse P' is applied at a polarity which is opposite to that of the gating pulse P applied to the gating pulse input 123 of the gating circuit 121 of FIG. 1. Furthermore, the gating circuit 121 has a run-in signal input 128 to which a run-in signal I is applied. This is also a signal having a polarity which is opposite to that of the inverted run-in signal I' applied to the run-in signal input 127 of the gating circuit 121 of FIG. 1.

The input 124 is connected to the base of an npn-transistor 141. The emitter of the transistor 141 is connected through a resistor 143 to ground (O) and its collector is connected through a resistor 145 to a positive supply voltage (+). The emitter and the collector of the transistor 141 are furthermore connected to the emitter and the collector of an npn-transistor 147 the base of which is connected to the input 128. The common collectors of the transistors 147 and 141 are connected through the output 119 of the gating circuit 129 and the input 117 of the trigger circuit 109 to the base of an npn-transistor 149 and the common emitters are connected through a line 151 to the emitter of the transistor 149. Furthermore the collector of the transistor 149 is connected to the collector of the npn-transistor 153, to the base of an npn-transistor 155 and through a resistor 157 to a positive supply voltage (+). The base of the transistor 153 is connected to the collector of the transistor 155, to the output 107 of the trigger circuit 109, to the collector of an npn-transistor 159 and through a resistor 161 to the positive supply voltage (+). The emitters of the transistors 153, 155 and 159 are mutually connected to ground (0) through a resistor 163. The base of the transistor 159 is connected through a resistor 164 to the positive supply voltage (+) and it is furthermore connected to the reset input 111 of the trigger circuit 109 which is again connected to the run-in signal input 128 of the gating circuit 121.

The operation of the circuit which is of a type having a low energy consumption (Philips Technical Review Volume 29, 1968, no. 12, page 363–page 367) will now be described with reference to FIG. 3.

In FIG. 3 there are plotted one below the other as a function of time a voltage waveform 165 of the run-in signal I at the input 128 of the gating circuit 121 which is also the reset signal R at the input 111 of the trigger circuit 109, a voltage waveform 167 of the gating signal P′ at the input 124 of the gating circuit 121, a voltage waveform 169 of the signal S at the output 119 of the gating circuit 122 which is also the set signal S at the set input 117 of the trigger circuit 109, and a voltage waveform 171 of the signal at the output 107 of the trigger circuit 109.

If the voltage is high at one of the inputs 124 or 128 of the gating circuit 121, the voltage at the common collectors of the transistors 141 and 147 and hence at the output 119 of the gating circuit 121 is low. If the voltages 165 and 167 are low at the two inputs 124 and 128, respectively, of the gating circuit 122, the voltage at the output 119 of the gating circuit 121 is high. At the instants $t_2$ and $t_7$ which denote the commencement and the end, respectively, of the negative going gating pulse P′ the voltage 169 at the output 119 of the gating circuit 121 is thus always low while said voltage 169 is an inverted run-in signal between the instant of commencement and end $t_2$ and $t_7$ of the gating pulse. Boolean algebraically, the signal 169 can be represented as PI′. In the case shown the instants $t_2$ and $t_7$ lie between the instants $t_1$ and $t_3$ and $t_6$ and $t_8$, respectively, which denote the end of half a period of the run-in signal.

The voltage waveform at the set input 117 of the trigger circuit 109 thus is dependent on the commencement and the end of the gating pulse P′. Due to the presence of a broken period of this waveform at the instant $t_7$ this waveform is less suitable to control a frequency divider directly as has been common practice until now. The frequency divider then obtained a phase error which was dependent on the fairly arbitrary position of the rear edge of the gating pulse relative to the edges of the run-in signal. Due to the control of the set input 117 of the trigger circuit 109 by means of this signal, in which case this trigger circuit only reacts to the signal transitions from low to high and thus not to the rear edge at $t_7$ of the set signal 169, this dependence is avoided. In that case the reset signal of the trigger circuit 109 must be provided by the run-in signal as will be described hereinafter.

The signal 169 is available at the set input 117 of the trigger circuit 109 and the signal 165 is available at the reset input 111. The transistors 153 and 155 of the trigger circuit 109 constitute a bistable multivibrator due to their mutual coupling. When the transistor 153 conducts the voltage at its collector is low and the transistor 149 to whose base the set signal is applied cannot exert influence on the condition of this multivibrator and the trigger circuit 109 is then in its set condition. The transistor 155 then does not conduct. Conversely, a voltage at the base of the transistor 159 cannot exert influence when the trigger circuit 109 is in its reset condition, thus when the transistor 155 conducts and the transistor 153 is cut off.

If the trigger circuit 109 is in its reset condition as is the case at the instant $t_1$, the transistor 155 conducts and the negative going edge of the reset signal 165 which is applied at this instant to the base of the transistor 159 does not have any influence. The trigger circuit 109 remains in its reset condition at the instant $t_1$, the output voltage 171 remains low. At the instant $t_2$ the set signal 169 at the input 117 and hence the base voltage of the transistor 149 has a positive going edge. The collector voltage of the transistor 149 will therefore decrease and hence also the base voltage of the transistor 155 so that the transistor 155 is cut off and the transistor 153 becomes conducting. The transistor 159 is then always cut off and does not have any influence on this change of condition. The trigger circuit then has come into its set condition.

At the instant $t_3$ the set signal 169 at the input 117 does not exert influence because the transistor 153 conducts and has a low collector voltage. The reset signal 165 at the base of the transistor 159 has a positive going edge and the collector voltage of this transistor 159 thus has a negative going edge. This is passed on the base of the transistor 153 of the multivibrator and causes this multivibrator to change its condition. The trigger circuit assumes the reset condition, the voltage 171 at its output 107 thus becomes low.

At the instants $t_4$ and $t_5$ the same change in condition occurs as that at the instant $t_2$, and at the instant $t_5$ the same change occurs as that as the instant $t_3$.

At the instant $t_6$ the trigger circuit assumes the set condition at which the transistor 153 conducts and the transistor 155 is cut off. As a result the set signal 169 cannot exert influence at the instant $t_7$ on the condition of the circuit and only at the instant $t_8$ the trigger circuit will be brought to its reset condition again as a result of the run-in signal 165 which serves as a reset signal, and the trigger circuit will remain in this condition until the instant corresponding to $t_2$ at the commencement of the subsequent line scanning.

If the rear edge of the gating signal P′ would be between the instants $t_5$ and $t_6$ the reset condition which started at the instant $t_5$ would no longer change because no positive going edge would occur in the set signal 169.

Due to the above-described control of the trigger circuit 109 it is thus achieved that the signal 171 at the output 107 thereof is discontinued at the end of the run-in period always after exactly one full period of the run-in signal and the frequency divider which is controlled by this output signal thus receives a very exact quantity of control so that the transition from the run-in condition to the indexing condition of this frequency divider is thus always equal.

It is possible to put the commencement of the set pulse with a combination of gating and trigger circuits always at the commencement of a run-in signal period. However, it has been found that this has generally little effect. Particularly, if a digital frequency divider is used the transition situation from running in to indexing is substantially only important.

FIG. 4 shows an embodiment of a circuit of a digital frequency divider 27. The reference numerals are as much as possible the same as those in FIG. 1. An additional input 26 is provided to which an indexing signal is applied in phase opposition with the indexing signal at the input 25. In addition to the inputs and outputs the signals occurring at the same height as those inputs and outputs are shown in an idealized form as a function of time, the instants $t_6$, $t_7$, $t_8$ corresponding to the same instants $t_6$, $t_7$, $t_8$ as in FIG. 3. In addition to the input 105 the output signal 171 of the trigger circuit 109 of FIG. 3 is shown. The time scales in FIG. 3 and FIG. 4 are not shown in their mutually correct proportions.

The frequency divider 27 has three bistable multivibrators including npn-transistor pairs 173, 175; 177, 179 and 181, 183.

The collectors of the transistors 173, 175, 177, 179, 181, 183 are connected to the outputs 29, 31, 33, 35, 37 and 39, respectively, and through resistors 185, 187, 189 191, 193 and 195 to a positive supply voltage (+). Furthermore, the collector of each of the transistors of one pair out of each transistor pair 173, 175; 177, 179 and 181, 183 is connected to the base of the other transistor of the pair. The emitters of the transistors are pairwise connected together and to ground through resistors 197, 199 and 201, respectively. The emitters of npn-transistors 203, 205 and 207 are connected to each emitter pair of the transistor pairs 173, 175; 177, 179 and 181, 183, respectively. The collectors of the transistors 203, 205 and 207 are connected to the emitters of the transistors 173, 177 and 183, respectively. The bases of the transistors 203, 205 and 207 are interconnected and are connected to the run-in signal input 105.

Furthermore, the frequency divider circuit 27 includes three npn-transistors 209, 211 and 230 whose emitters are connected to the indexing signal input 25 and whose collectors are connected to the outputs 31, 35 and 39, respectively, and whose bases are connected to the outputs 35, 39 and 31, respectively, and three npn-transistors 215, 217 and 219 whose emitters are connected to the other indexing signal input 26 and whose collectors are connected to the outputs 29, 33 and 37, respectively, and whose bases are connected to the outputs 33, 37 and 29, respectively.

The voltage waveforms associated with the outputs 29, 31, 33, 35, 37 and 39 are denoted by the reference numerals 221, 223, 225, 227, 229 and 231, respectively, and those at the inputs 25 and 26 are denoted by 233 and 235, respectively.

The operation of the circuit is as follows:

The transistors 203, 205 and 207 the bases of which receive the run-in signal 171 through the input 105 can only exert influence on the circuit when the voltage at the input 105 is high. In that case they maintain the circuit always in the condition at which the transistors 173 and 177 and 183 are cut off. The voltages 221, 225 and 231 at the outputs 29, 33 and 39, respectively, are then high and the voltages 223, 227 and 229 at the outputs 31, 35 and 37 respectively, are low. This is the case during the period from $t_6$ to $t_8$, the last portion of the occurrence of the run-in signal 171, independently of the voltages at the inputs 25 and 26. This situation always occurs at the end of the run-in signal so that at the commencement of the indexing signal 233, 235 taking over the control of the frequency divider at the instant $t_8$ the frequency divider is always in the same condition. At the instant $t_8$ the run-in signal 171 ends and the indexing signal 233, 235 gains influence through the transistors 209, 211, 213, 215, 217 and 219. Only the transistor of the six mentioned of which both the collector and the base have a high voltage and which is controlled in such a manner that this collector voltage decreases, that is to say, the emitter voltage decreases, can exert influence on the condition of an associated multivibrator. At the instant $t_8$ this is the case with the transistor 215. The transistor 215 causes the condition of the multivibrator 173, 175 to vary. At the instant $t_9$ the transistor 213 causes the multivibrator 181, 183 to vary its condition; at the instant $t_{10}$ the transistor 217 causes the multivibrator 177, 179 to vary its condition; at the instant $t_{11}$ the transistor 209 causes the multivibrator 173, 175 to vary its condition; at the instant $t_{12}$ the transistor 219 causes the multivibrator 181, 183 to vary its condition; at the instant $t_{13}$ the transistor 211 causes the multivibrator 177, 179 to vary its condition, etc.

Symmetrical square-wave voltages (whose alternately high and low portions are equally long) are produced in phase opposition at the outputs pairs 29, 31; 33, 35 and 37 39 which voltages are phase shifted over a third period (120°) from pair to pair. The frequency of these voltages is one third of the frequency of the indexing signal at the input pair 25, 26.

The voltages at the outputs 29, 31, 33, 35, 37 and 39 appear at the inputs 41, 43, 45, 47, 49 and 51, respectively, of the modulator circuit 53 of FIG. 5. Since the square-wave voltages are symmetrical they contain only a small number of disturbing harmonics so that the output voltage of the modulator circuit 53 will in turn contain a minimum number of disturbing harmonics.

The modulator circuit 53 of FIG. 5 is built up in a balanced form. The reference numerals correspond as much as possible to those in the previous Figures. A plurality of additional inputs 56, 58 and 60 has been provided to which color difference signals (R-Y), (B-Y) and (G-Y) are applied in phase opposition with those at the inputs 55, 57 and 59, respectively. Furthermore, the output has a balanced form with a second connection 62 at which the modulated signal appears in phase opposition with that at the output 61.

The modulator circuit 53 is built up as follows. The inputs 55, 56, 57, 58, 59 and 60 are connected to the interconnected emitters of npn-transistor pairs 237, 239; 241, 243; 245, 247; 249, 251; 253, 255 and 257, 259 respectively, The collector of one of the transistors out of each pair of transistors 237, 241, 245, 249, 253 and 257, respectively, are connected to the output 61, those of the other transistors 239, 243, 247, 251, 255 and 259, respectively, are connected to the output 62.

The base of the transistor 237 is connected to that of the transistor 243 and to the input 41. The bases of the transistors 239 and 241 are connected to the input 43, those of the transistors 245 and 251 are connected to the input 45, those of the transistors 247 and 249 are connected to the input 47, those of the transistors 253 and 259 are connected to the input 49 and those of the transistors 255 and 257 are connected to the input 51.

The operation of the modulator circuit is as follows. The voltages 221, 223, 225, 227, 229 and 231 of FIG. 4 are present at the inputs 41, 43, 45, 47, 49 and 51, respectively.

From $t_8$ to $t_{11}$ the voltage at the input 41 is low and is high at the input 43. The transistors 237 and 243 are then cut off and the transistors 239 and 241 conduct. The input 55 is then connected to the output 62 and the input 56 is connected to the output 61. In that case a −(R-Y) signal is passed on to the output 61 and a +(R-Y) signal is passed on to the output 62.

From $t_{11}$ to $t_{14}$ the voltage at the input 41 is high and is low at the input 43. The transistors 237 and 243 then conduct and the transistor 239 and 241 are cut off. The input is then connected to the output 61 and the input 56 is then connected to the output 62. The polarities of the voltages passed on to the outputs 61 and 62 are now opposite to those during the periods from $t_8$ to $t_{11}$. Thus a symmetrical square-wave voltage is passed on to both balanced outputs 61 and 62 the amplitude of which square-wave voltage depends on the amplitude of the red color difference signal (R-Y) at the balanced inputs 55 and 56.

This symmetrical square-wave voltage has a fundamental frequency which is equal to that of the signal at the outputs 29 and 31 of the frequency divider circuit 27 and includes a number of higher harmonics which are filtered therefrom by means of the filter circuit 65 connected to the outputs 61 and 62. Due to the substantial absence of a harmonic as a result of the symmetry in the square-wave voltages the filter circuit 65 can be proportioned in a favorable manner.

Analogously, a (B-Y) modulated signal is passed on to the outputs 61 and 62 under the influence of the voltages 225 and 227 at the inputs 45 and 47 and a (G-Y) modulated signal is passed on to the inputs 49 and 59 of the modulator circuit 53 under the influence of the voltages 229 and 231. These passed-on (B-Y) and (G-Y) modulated signals at the outputs 61 and 62 include first harmonics which are phase shifted 120° and 240°, respectively, relative to the first harmonic of the above described passed-on (R-Y) modulated signal. Thus the signal at the output 67 of the filter circuit 65 includes the color information in a dot-sequential form as is required for the control of a picture display tube of the indexing type. It is only necessary to transform the frequency to the writing frequency.

The described embodiment of the gating circuit, the trigger circuit, the divider circuit and the modulator circuit are particularly suitable for an integrated embodiment due to the small heat development and the D.C. couplings used.

What is claimed is:

1. A color television display device comprising an index type cathode ray tube having successive sets of colored light emissive elements scanned by an electron beam at a color writing frequency, said cathode ray tube at output means thereof being adapted to produce a first index signal at a frequency fractionally related to the said writing frequency and a second index signal having at the beginning of each line scan a frequency equal to said writing frequency, means for converting said firs indexing signal into a color information modulated signal having a frequency equal to said writing frequency, said means comprising frequency dividing means coupled to said tube output means for producing an output signal at a submultiple of said first said index signal, a trigger circuit coupled to said frequency-dividing means and adapted to synchronize the same at said submultiple frequency upon recurrent operation of said trigger circuit at the frequency of said second index signal, means for applying said second index signal as a first input to said trigger circuit to place the same in one condition of operation, means for deriving from said second index signal a control signal having a duration longer than a plurality of the cyclic variations of said second index signal and occurring at the start of each line scan, means responsive to said control signal for applying said second index signal as a second input to said trigger circuit thereby to cyclically vary the condition of operation of said trigger circuit during the said start of each line scan, means coupled to said frequency dividing means and responsive to a source of color signals and said first index signal for producing a color modulated signal at the writing frequency, and means for applying said latter signal to said cathode ray tube.

2. A color television display device as claimed in claim 1, further comprising a limiter circuit interposed between said cathode ray tube output means and the inputs to said trigger circuit.

3. A color television display device as claimed in claim 1, wherein said frequency dividing means is a digital divider circuit.

4. A color television display device as claimed in claim 3, wherein the digital divider circuit is a counter circuit having symmetrical output voltage or current waveforms.

5. A color television display device as claimed in claim 4, wherein said counter circuit divides by a three-to-one ratio and said divider has three outputs each of which is connected to a matching signal input of a different one out of three modulators, a video signal input of each modulator being connected to an output of a red, a blue and a green color difference signal source, respectively.

* * * * *